US012110641B1

(12) United States Patent
Stepp

(10) Patent No.: US 12,110,641 B1
(45) Date of Patent: Oct. 8, 2024

(54) HEATABLE HOSE ASSEMBLY FOR ASPHALT REPAIR AND METHODS OF USE

(71) Applicant: Stepp Manufacturing Co., Inc., North Branch, MN (US)

(72) Inventor: Shane Stepp, North Branch, MN (US)

(73) Assignee: Stepp Manufacturing Co., Inc., North Branch, MN (US)

( * ) Notice: Subject to any disclaimer, the term of this patent is extended or adjusted under 35 U.S.C. 154(b) by 0 days.

(21) Appl. No.: 18/374,234

(22) Filed: Sep. 28, 2023

Related U.S. Application Data

(63) Continuation-in-part of application No. 18/237,098, filed on Aug. 23, 2023.

(51) Int. Cl.
*E01C 19/45* (2006.01)
*E01C 11/00* (2006.01)
(Continued)

(52) U.S. Cl.
CPC ............ *E01C 19/45* (2013.01); *E01C 11/005* (2013.01); *E01C 23/14* (2013.01); *F16L 11/127* (2013.01)

(58) Field of Classification Search
CPC ........ E01C 19/45; E01C 11/005; E01C 23/14; F16L 11/127
(Continued)

(56) References Cited

U.S. PATENT DOCUMENTS 3,286,078 A * 11/1966 Hynes ................... H05B 3/58
219/548
6,049,658 A 4/2000 Schave et al.
(Continued)

FOREIGN PATENT DOCUMENTS

EP 0908075 B1 9/2004
RU 2163651 C2 2/2001

OTHER PUBLICATIONS

Asphalt Maintenance Equipment Guide, Stepp Mfg. (2021) https://steppmfg.com/wp-content/uploads/2022/07/2021-Equipment-Guide.pdf.

(Continued)

*Primary Examiner* — Nathaniel E Wiehe
*Assistant Examiner* — Thomas J Ward
(74) *Attorney, Agent, or Firm* — Sierra IP Law, PC; Mark D. Miller

(57) ABSTRACT

The present invention provides an improved heated hose for use with asphalt pavement repair machines that includes a flexible exterior cylindrical insulated hose portion with an inner cylindrical surface defining an inner cylindrical region, and a flexible metal sheath deployed coaxially in this region having an exterior surface, the surfaces defining an area through which hot asphalt flows. A heating element may be removably deployed inside and along the length of the coaxial metal sheath. Hot asphalt flowing through the hose between the inner cylindrical surface of the hose and the exterior surface of the coaxial metal sheath is kept hot by the conduction of heat from the heating element inside the flexible metal sheath. One end of the heating element extends to a far end of the inside of the sheath, and the other end of the heating element is accessible from outside of the near end of the hose, making it possible to easily remove and replace the heating element in the event of a failure. A novel connecting block is provided where the hose connects to the heating machine providing a passageway for the sheath that allows for removal and replacement of the heating element, while also providing a passageway that allows hot asphalt to enter into the hose around the sheath.

16 Claims, 13 Drawing Sheets

(51) Int. Cl.
*E01C 23/14* (2006.01)
*F16L 11/127* (2006.01)

(58) Field of Classification Search
USPC .................. 392/466, 472, 478; 374/141, 147
See application file for complete search history.

(56) References Cited

U.S. PATENT DOCUMENTS

| | | | |
|---|---|---|---|
| 7,266,293 | B1 | 9/2007 | Dundas |
| 7,773,867 | B2 * | 8/2010 | Bourget ............. G05D 23/1928 |
| | | | 392/468 |
| 9,822,592 | B2 | 11/2017 | Bujold et al. |
| 11,186,959 | B2 | 11/2021 | Coe |
| 2013/0248512 | A1 | 9/2013 | Intagliata et al. |
| 2015/0144217 | A1 * | 5/2015 | Reusche ................. F16L 53/38 |
| | | | 138/33 |

OTHER PUBLICATIONS

OJK-V, Stepp Oil Jacketed Kettle (brochure) (2022) https://steppmfg.com/wp-content/uploads/2022/03/OJK-V-Sell-Sheet-2014.pdf.
OJK—Horizontal Crack Sealers with Smart Technology (brochure) (2022) https://steppmfg.com/wp-content/uploads/2022/03/OJK-H-For-Email.pdf.
Stepp Mfg, Crack Sealing Trailers—web page (https://steppmfg.com/crack-sealing/).
Stepp Mfg—OJK-V Oil Jacketed Crack Sealer Vertical—web page (https://steppmfg.com/product/crack-sealing/ojk-v-crack-sealer-vertical/).
Stepp Mfg—OJK-H Oil Jacketed Crack Sealer Horizontal—web page (https://steppmfg.com/product/crack-sealing/ojk-h-crack-sealer-horizontal/).
English Translation RU2163651.

* cited by examiner

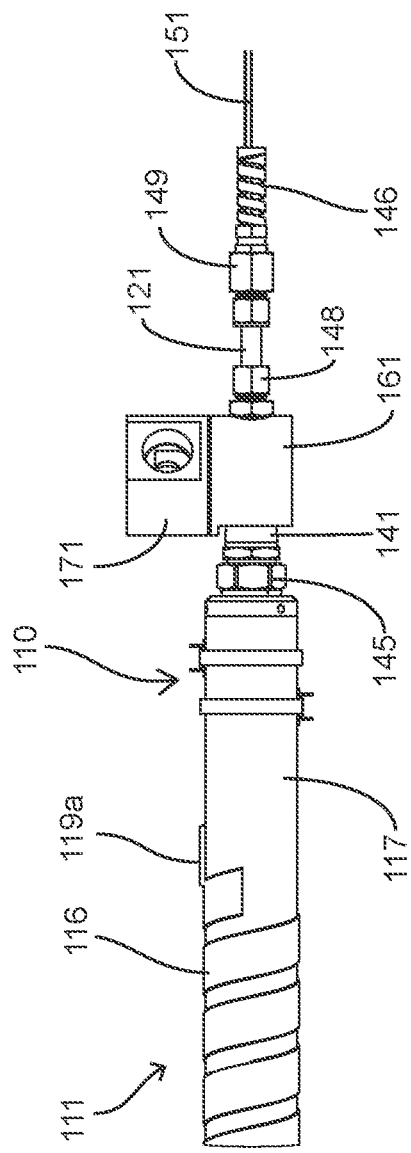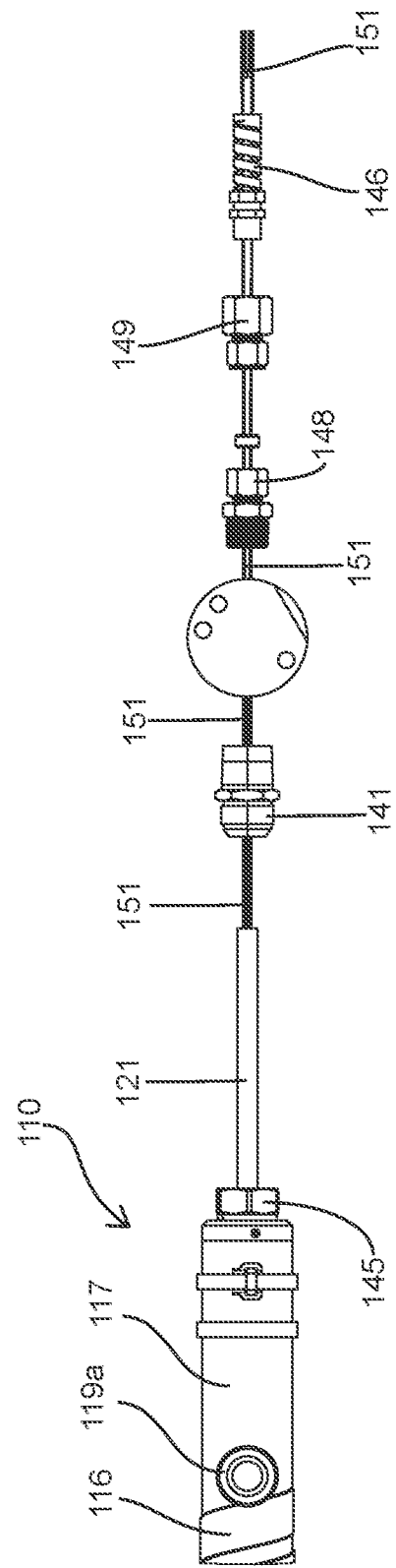
FIG. 6A
FIG. 6B

HEATABLE HOSE ASSEMBLY FOR ASPHALT REPAIR AND METHODS OF USE

FIELD OF THE INVENTION

The present invention relates generally to machinery used in repairing asphalt pavement and, more particularly, to an improved heatable hose apparatus for use in machines used to repair cracks in asphalt pavement, and related methods.

BACKGROUND OF THE INVENTION

Because of its high durability and cost-effectiveness, asphalt is a commonly used paving material. However, it is subject to a variety of deteriorating conditions such as cracking due to wear and tear, exposure to harsh weather conditions, and heavy traffic. The industry has developed a number of solutions to repair these defects in asphalt pavement, primarily using specialized machines designed for the task.

A typical asphalt pavement repair machine comprises a heater for heating asphalt to a suitable pouring temperature, a heated hose, and a wand for directing the heated asphalt to the cracks. The repair of asphalt paving generally involves the insertion or injection of a hot asphalt compound into the cracks in the paving using a wand. Typical hot asphalt compounds include without limitation asphalt emulsions, cut back asphalt, rubberized asphalt and polymerized asphalt. Controls on the wand may be operated to start and stop the flow of the hot asphalt compound, and to speed up or slow down the delivery of the asphalt compound. Once the hot asphalt cools, it seals the cracks, extending roadway life.

A heated hose is instrumental in maintaining the temperature of the asphalt as it travels from the heating unit to the wand. A wand is a tool used to direct the application of hot asphalt into cracks in a controlled manner, ensuring precision and efficiency in the repair process. The melter incorporates a heated overhead boom that allows for an extended reach, minimizing the need for machine repositioning and thereby reducing the time and cost of repair. Because the asphalt must travel a considerable distance between the heating unit and the end of the wand, it is necessary to use a heated connecting hose to keep the asphalt hot during this trip. Having a heated application system, set to the manufacturer's specifications, will enable the product to be applied correctly.

A constant challenge facing the asphalt pavement repair industry is failure of the heated hose. A temperature drop in the hose can result in clogging, which can take a pavement repair machine out of service until the hose can either be repaired or replaced, which may require significant time and effort to rectify.

Different heated hoses have been developed to heat asphalt compound for application to pavement cracks. Some heated hoses have a hollow interior conduit through which the heated asphalt travels. In these hoses, the conduit is surrounded by a heating element which may be in the form of a coaxial heated cylinder, or heated helical cord. One or more layers of insulation may be provided around the outside of the heating element to make it possible to handle the hose. Unfortunately, over time, the constant bending and handling of hoses of this type may result in failure of the heating element. When this happens, the asphalt compound inside the hose will cool and solidify. Because of the construction of these hoses, it is either impracticable or cost prohibitive to repair these hoses once they fail, so they must generally be replaced. This results in significant down time for the paving repair machine, as well as significant cost.

Another challenge facing the asphalt repair industry is keeping the asphalt compound hot throughout the entire journey from inside the heating machine to the nozzle of the wand. Current application devices suffer from the drawback of cold spots along this route, particularly as the asphalt compound travels through the junction box where the hose connects to the machine, along the length of the hose, and at the end of the hose (usually at a swivel) where the hose meets the wand. There is therefore a need in the asphalt repair industry to provide a heating application system that is continuously heated from and through the junction box, through the hose, and at the swivel.

It is therefore desirable to provide a heated hose for use in asphalt pavement repair machines that provides the heat necessary to keep the asphalt compound hot through the junction box, hose and swivel, and which may be quickly and easily serviced in the field in the event of a heating element failure.

SUMMARY OF THE INVENTION

The present invention provides an improved heated hose for use with asphalt pavement repair machines that includes a flexible exterior cylindrical insulated hose portion with an inner cylindrical surface defining an inner cylindrical region, and a flexible metal sheath deployed coaxially in this region defining an area between the inner cylindrical surface of the hose and the outer surface of the flexible metal sheath through which hot asphalt flows. The interior of the inner coaxial metal sheath defines an elongated coaxial air chamber, and a heating element may be removably provided in this air chamber in the form of an elongated wire that is deployed along the length of the inner coaxial metal sheath. Hot asphalt flowing through the hose between the inner cylindrical surface of the hose and the coaxial metal sheath is kept hot by the conduction of heat from the heating element inside the internal air chamber to the flexible metal sheath. One end of the heating element extends to the distal end of the inside of the sheath, and the other end of the heating element is accessible from the outside of the proximal end of the hose, making it possible to easily remove and replace the heating element in the event of a failure.

Embodiments of the hose of the present invention are designed to extend between a machine for heating asphalt compound for repair and a wand used to apply the heated asphalt to pavement cracks. In these embodiments, a proximal end of the hose may be connected to the asphalt heating machine and a distal end of the hose may be connected to a proximal end of the application wand, so that the heated asphalt may flow through the hose to the wand and exit through a nozzle at the distal end of the wand. In some embodiments, a swivel may be provided where the hose connects to the wand allowing greater mobility, and making it possible to connect the wand without rotating the entire hose.

Embodiments of the invention may include a novel connecting block located at the junction of the proximal end of the hose and the heating machine. Embodiments of the connecting block may include a first passageway through which the sheath for the heating element is provided and which traverses the block, the sheath extending into the coaxial region in the middle of the hose such that a heating element may be removably inserted into this sheath. The connecting block may also include a second passageway for receiving hot asphalt from the machine and transferring it to the first passageway and then into the hose, such that the hot asphalt flows coaxially around the sheath which has the heating element inside. The sheath extending through the first passageway makes it possible to quickly and efficiently remove and replace the heating element from the sheath without detaching the hose from the block.

In some embodiments of the invention, a movable boom may be provided with the heating machine, and the hose may be attached to the boom thereby expanding the range of application. In some embodiments, the wand may include controls that allow the user to start and stop the flow of hot asphalt, and/or to speed up or slow down the flow of hot asphalt, according to different pavement conditions. Wires may be provided within the outer jacket of the hose to transmit electronic signals from the wand to an electronic control of the heating machine. Additional wires may be provided from the electronic control that leads to a connector that may be removably engaged with the heating element and an associated temperature sensor. This allows the electronic control in the heating machine to regulate, maintain and/or change the temperature inside the hose.

Some embodiments of a hose of the present invention may be assembled by starting with a flexible conduit such as a one-inch (1") diameter Teflon® hose with JIC fitting at a proximal end, and an NPT fitting at the distal end. The conduit may then be wrapped or covered with insulation. The insulation may be secured in place by any suitable method, for example, by using a high temperature film or Kapton® tape. A wire harness may then be then laid over the film or tape holding the insulation in place, and a hose jacket may be slid over the conduit and insulation. Openings may be provided in the surface of the hose jacket at opposite ends (proximal and distal) of the hose for the wires to enter and exit. A first connector (e.g., 6 pin) may be provided on the wire harness at the distal end of the hose for connection to the wand controls; and a second large connector (e.g., 19 pin) may be provided on the wire harness at the proximal end of the hose. An additional small connector (e.g., 4 pin) may also be provided at the proximal end for engagement with the heating element and temperature sensor. The jacket and wire harness may be held in place using several band clamps that are crimped in place. These fittings may be secured to the conduit ends by use of set screws so the jacket and insulation stay in place.

These embodiments may also include parts used to install onto the unit. The proximal end of the hose may be connected to a NPT×JIC fitting which in turn is connected to a custom machined block. The block may contain holes to capture a thermowell (sheath) that is inserted through the block and into the hose. When constructing the hose, the thermowell may be installed by inserting it from the distal end of the hose so that it runs through the entirety of the hose to the proximal end and beyond, through the NPT×JIC fitting, through a modified compression fitting attached to the block (to seal it from material leaking out of the block), into and through the block, and finally into a final compression fitting at the opposite side of the block. A set of securing parts and hardware may be attached to the end of the thermowell at the distal end of the hose to prevent it from sliding during use. The distal end of the thermowell is closed off, and the proximal end of the thermowell is open in order to receive a heating element that may be inserted into the thermowell.

In some embodiments, a swivel fitting may be installed onto the distal end of the hose and over the thermowell retaining parts; a reducing coupling may be installed into the swivel; and a pipe nipple may be installed into the reducing coupling for installation to the product wand. At the opposite end of the thermowell, a cable gland may be installed into the end compression fitting. The heating element & RTD (sensor) assembly may then be inserted into the thermowell from the proximal end, and the small (e.g., 4-pin) plug may then be attached to a corresponding receptacle on the heating element. The first connector (e.g., 6-pin) may then be connected to the wand, and the larger second connector (e.g., 19-pin) may then be connected to a temperature control system on the heating machine.

The hose assembly of some embodiments of the invention may be installed onto the supply plumbing of the asphalt heating machine using a second block similar to the custom machined block of embodiments of the invention. This second block may be attached to the custom machine block of the hose assembly and a gasket may be provided between the blocks. Standard hardware (e.g. ⅜") may be used to secure the blocks and gasket together, and to secure them to the heating machine.

In use, a specially machined block of an embodiment of the present invention may be attached to an asphalt heating machine. An input hose from the heating machine may be engaged with an upper opening on the block, and the block may be secured to the heating machine. A proximal end of a heated hose of an embodiment of the present invention may be engaged with one end of a passageway through the block such that an internal flexible metallic sheath extends through the block and protrudes out the other side. Fittings are attached to both ends of the passageway through the block to seal the inside, preventing hot asphalt from leaking out. A heating element which may be in the form of a wire with a temperature sensor thereon may then be inserted into the open end of the sheath protruding from the block, such that the heating element extends through the sheath along the length of the heated hose to the distal end of the hose (which may be a distance of twelve feet (12')). The heating element may then be secured in place. A wire connector may be engaged with a mating connector on the heating machine to place it in electronic communication with a control on the heating machine; a small connector on the heating element may be engaged with a mating connector; and another connector at the distal end of the hose may be electronically connected to a mating connector on the wand. Hot asphalt may be introduced into the hose and into the coaxial area around the sheath which is kept hot by conduction of heat from the heating element to the sheath. The control may then regulate the temperature of the heating element, sheath and asphalt. An operator may use the wand controls to start, stop, increase or decrease the flow of asphalt through the hose. Should the heating element fail, it may be quickly and easily disconnected, removed from the sheath, and replaced with another heating element. The replacement heating element may be inserted into the sheath, secured, and electronically connected without the necessity of disconnecting or removing the heated hose itself.

In some aspects of the invention, a heatable hose for use with a heating machine for asphalt repair is provided, the hose comprising a flexible cylindrical conduit having insulation around an exterior surface thereof, the hose having a hollow internal cylindrical region; a flexible metallic sheath provided coaxially inside the internal cylindrical region of the conduit such that a coaxial space is provided between an outer surface of the sheath and an inner surface of the conduit; and an elongated heating element is removably provided inside and along the length of the flexible metallic sheath, wherein hot asphalt introduced into the coaxial space is kept hot by the conduction of heat from the heating element to the flexible metallic sheath.

In related aspects, the heatable hose further comprises a temperature sensor provided with the heating element. In some aspects, a swivel is provided at a distal end of the hose where it engages with a wand. In other aspects, the heatable hose has a cylindrical jacket provided around the insulation on the conduit, and a first grommet is provided in said jacket at a proximal end of said hose, and a second grommet is provided in said jacket at a distal end of said hose, and a plurality of wires are provided between the jacket and the insulation, such that the wires enter through one of the grommets and exit through the other grommet. In other aspects, wires extend through the second grommet and terminate at a connector that is adapted for engagement with a corresponding mating adaptor on the wand. In other aspects, the wires extend through the first grommet and terminate at a first connector that is adapted for engagement with a first corresponding mating adaptor on the heating machine, and other wires extend through the first grommet and terminate at a second connector that is adapted for engagement with a second corresponding mating adaptor on the heating element.

In some aspects, the heatable hose includes a junction block adapted for engagement with a proximal end of the hose and with the heating machine for receiving hot asphalt, the junction block having a first passageway extending through it from a first side to an opposite side, and a second passage way extending from a top of the block into the first passageway forming an inverted "T". In some embodiments, a pair of connectors are sealingly provided at opposite ends of the first passageway, each of the pair of connectors having a central opening therein for sealingly receiving the flexible metallic sheath such that the sheath extends across and through the first passageway leaving coaxial space around the sheath for receiving hot asphalt. In some aspects, a rigid metallic tube may be attached (e.g., welded) to one or both ends of the flexible metallic sheath.

In other aspects, embodiments of the invention include methods for keeping asphalt hot during pavement repair operations comprising the following steps: (a) engaging a junction block to an asphalt heating machine, said junction block comprising a first passageway extending through said block from a first opening on a first side of said block to a second opening on an opposite side of said block, and a second passageway extending from a third opening on an end of said block and intersecting with said first passageway wherein said heating machine is in fluid communication with said third opening; (b) engaging a heatable hose with said first opening of said block, said hose comprising (i) a flexible cylindrical conduit having insulation around an exterior surface thereof, and having a hollow internal cylindrical region; and (ii) an flexible metallic sheath provided coaxially inside said internal cylindrical region of said conduit such that a coaxial space is provided between an outer surface of said sheath and an inner surface of said conduit; (c) extending said sheath through said first passageway of said block and sealing said first and second openings around said sheath; (d) engaging an opposite end of said hose to an application wand; (e) inserting an elongated heating element into said flexible metallic sheath through the second opening in said block and extending said heating element along the length of said flexible metallic sheath; (f) introducing hot asphalt into said block for tassage through said hose around said sheath and to said wand for application to pavement cracks; and (g) operating said heating element to keep said asphalt hot as it travels through said hose.

In related aspects, should the heating element fail, the methods may also include the steps of removing the elongated heating element from the sheath by pulling it from the second opening in the block, and inserting a replacement heating element into the flexible metallic sheath through the second opening in the block and extending the replacement heating element along the length of the flexible metallic sheath.

It is therefore an object of the present invention to provide an improved heated hose for connection between an asphalt heating machine and a movable wand to convey hot asphalt used to repair cracks in asphalt pavement.

It is also an object of the present invention to provide a heated hose for connection between an asphalt heating machine and a movable application wand having a central coaxial air chamber surrounded by a flexible metal conduit with a heating element deployed in said air chamber.

It is also an object of the present invention to provide a heated hose for connection between an asphalt heating machine and a movable application wand in which hot asphalt travels through said hose in a coaxial area around a heated central flexible metal conduit, where the metal conduit has an elongated heating element deployed therein.

It is also an object of the present invention to provide a heated hose for connection between an asphalt heating machine and a movable application wand in which a central coaxial heating element may be easily removed and replaced without disconnecting the hose from the heating machine or the wand.

It is also an object of the present invention to provide methods and apparatus for easily and quickly removing and replacing a heating element from a heated hose connected between an asphalt heating machine and a movable application wand.

It is also an object of the invention to insure the proper temperature of the product being applied.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 6A is a side view of one end of an embodiment of the hose of the present invention.

FIG. 6B is an exploded top view of one end of an embodiment of the hose of the present invention.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention, including different combinations of the features identified herein. In the following disclosure, specific details are given to provide a thorough understanding of the invention. However, it will be apparent to one skilled in the art that the present invention may be practiced without all of the specific details provided.

Figure 1:
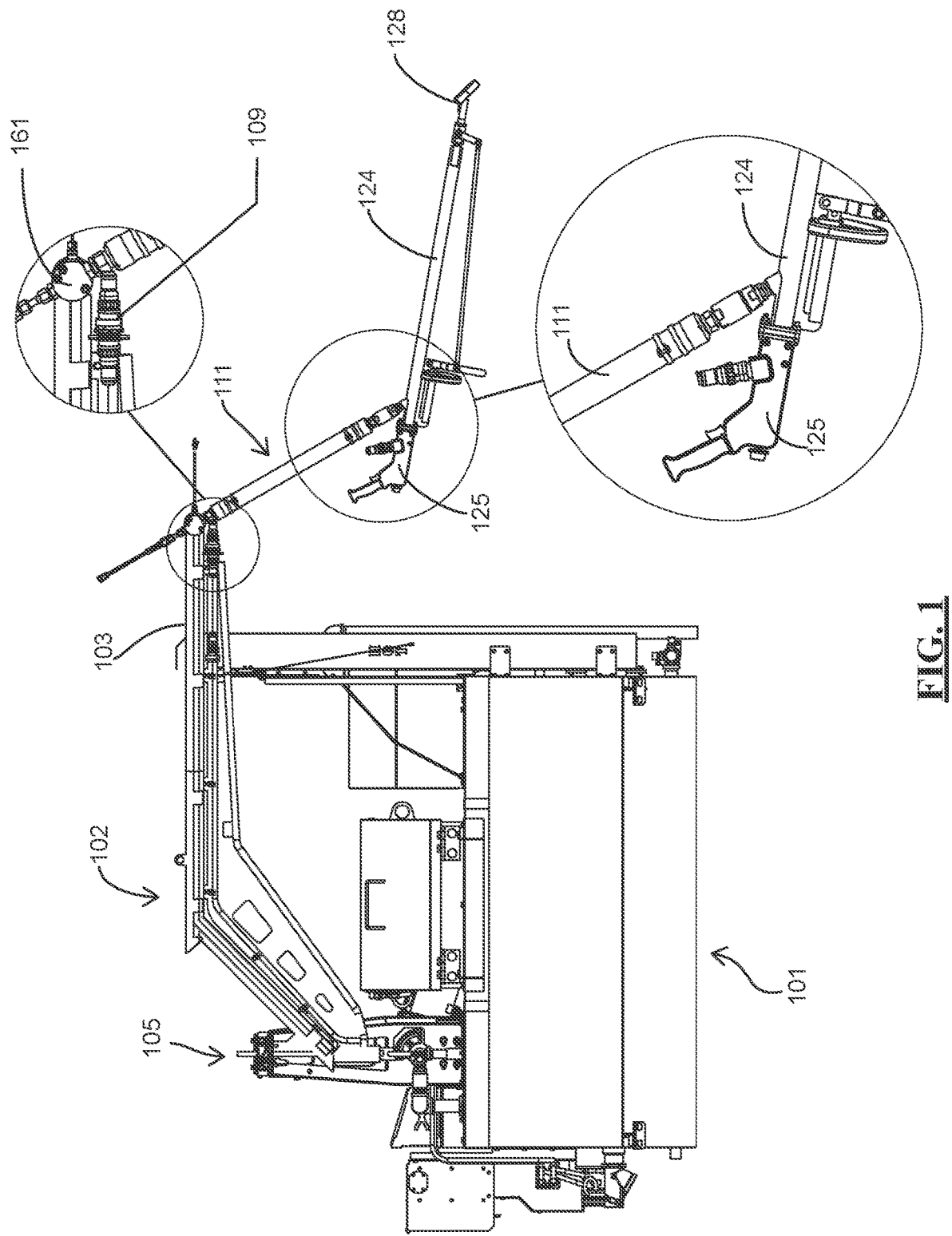
FIG. 1 is a side view of an exemplary asphalt heating machine incorporating an embodiment of the hose of the present invention, with detailed views of portions thereof.
Figure 2:
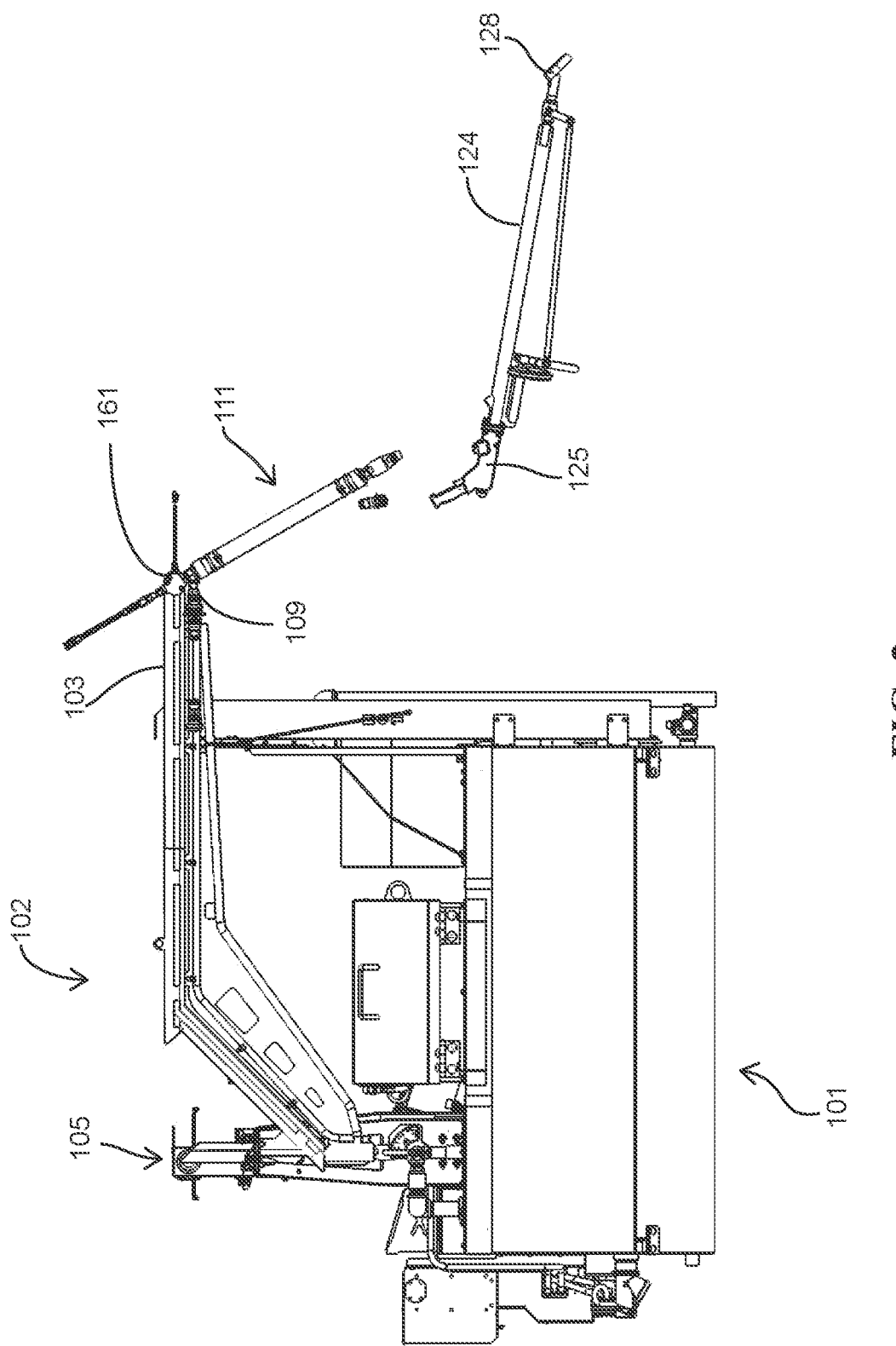
FIG. 2 is a side view of an exemplary asphalt heating machine incorporating an embodiment of the hose of the present invention

Referring to the drawings, wherein like reference characters designate like or corresponding parts throughout the several views, and referring first to FIG. 1, it is seen that the present invention is designed to be attached to an asphalt heating machine 101 which may or may not have a boom assembly 102 that may be rotatably mounted thereon at pivot 105. Boom 102 may include an outwardly extending arm 103 to which a hose 111 of the present invention may be engaged. In some embodiments, hose 111 may have a length of twelve feet (12'), but in other embodiments, hose 111 may be longer or shorter. For example and without limitation, if a boom is present, hose 111 may have a length of between six feet (6') and twelve feet (12') that may be moved around pivot 105; in other embodiments, if for example no boom assembly is provided, then hose 111 may be longer, having a length of between twelve feet (12') and twenty feet (20'). A support 109 for hose 111 may be provided either on boom arm 103 or, if no boom is provided, on heating machine 101. Detail of an exemplary engagement of an embodiment of hose 111 to support 109 is shown in FIG. 1. A proximal end of hose 111 may be engaged with support 109, and a distal end of hose 111 may be engaged with wand 124. A handle 125 may be provided at a proximal end of wand 124, and a nozzle 128 may be provided at a distal end of wand 124. Detail of a wand engagement is shown in FIG. 1.

Figure 3A:
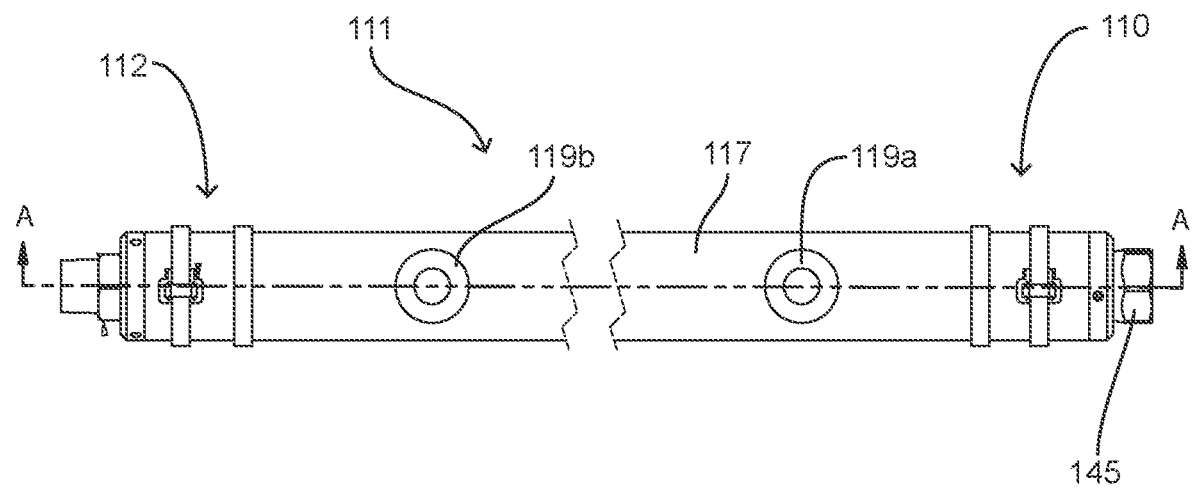
FIG. 3A is a side view of an embodiment of the present invention without a heating element.
Figure 3B:
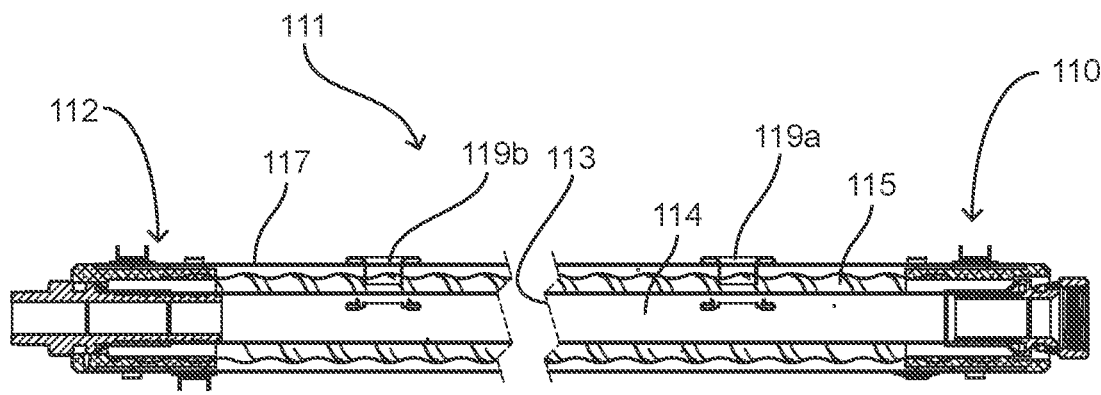
FIG. 3B is a sectional side view along line A-A of FIG. 3A.

Referring to the exemplary embodiment of hose 111 shown in FIGS. 3A and 3B, it is seen that hose 111 includes an inner flexible tubular element 113 having a hollow interior region 114. In some embodiments, tubular element 113 may be made of Teflon® or another similar material that is flexible and is capable of withstanding the high temperature of hot asphalt flowing through the interior region 114. The internal diameter of tubular element 113 should be wide enough to receive both a tubular thermowell in the form of a sheath 118 that contains a heating element 151, as described more fully below, and to also receive hot fluid asphalt compound. In some embodiments, tubular element 113 may have an internal diameter of one inch (1"), although other diameters may be used depending on the length of the hose 111 and the mixture of heated materials traveling through the hose 111. In embodiments of the invention, a layer of insulation 115 is provided around the outside of tubular element 113 to help prevent heat from dissipating away. In some embodiments, the insulation 115 may be held in place using tape or other material which is wrapped around the insulation layer 115. An exterior sleeve or jacket 117 is provided around the insulation 115.

Figure 4A:
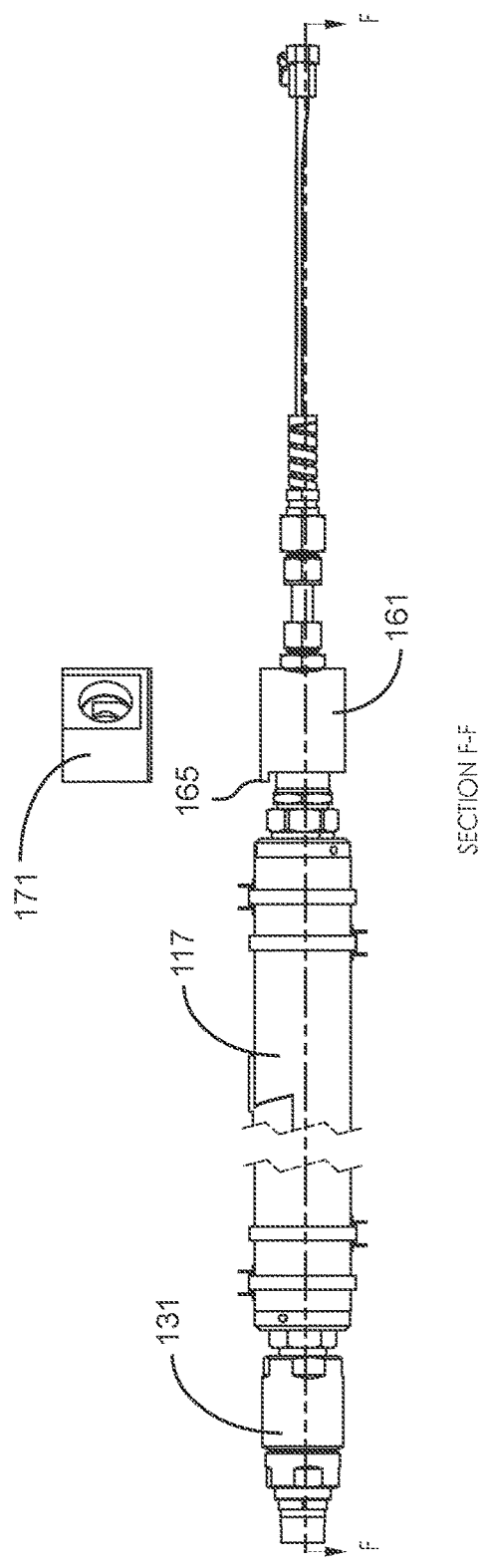
FIG. 4A is a side view of an embodiment of the hose of the present invention.
Figure 4B:
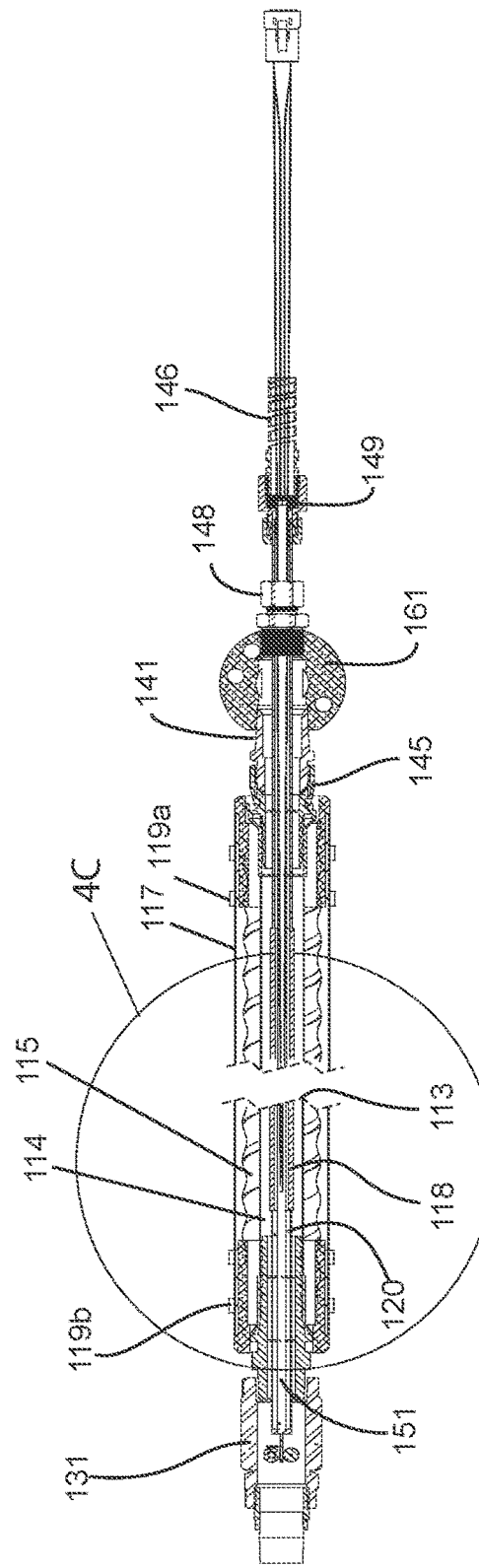
FIG. 4B is a top sectional view along line F-F of FIG. 4A.
Figure 4C:
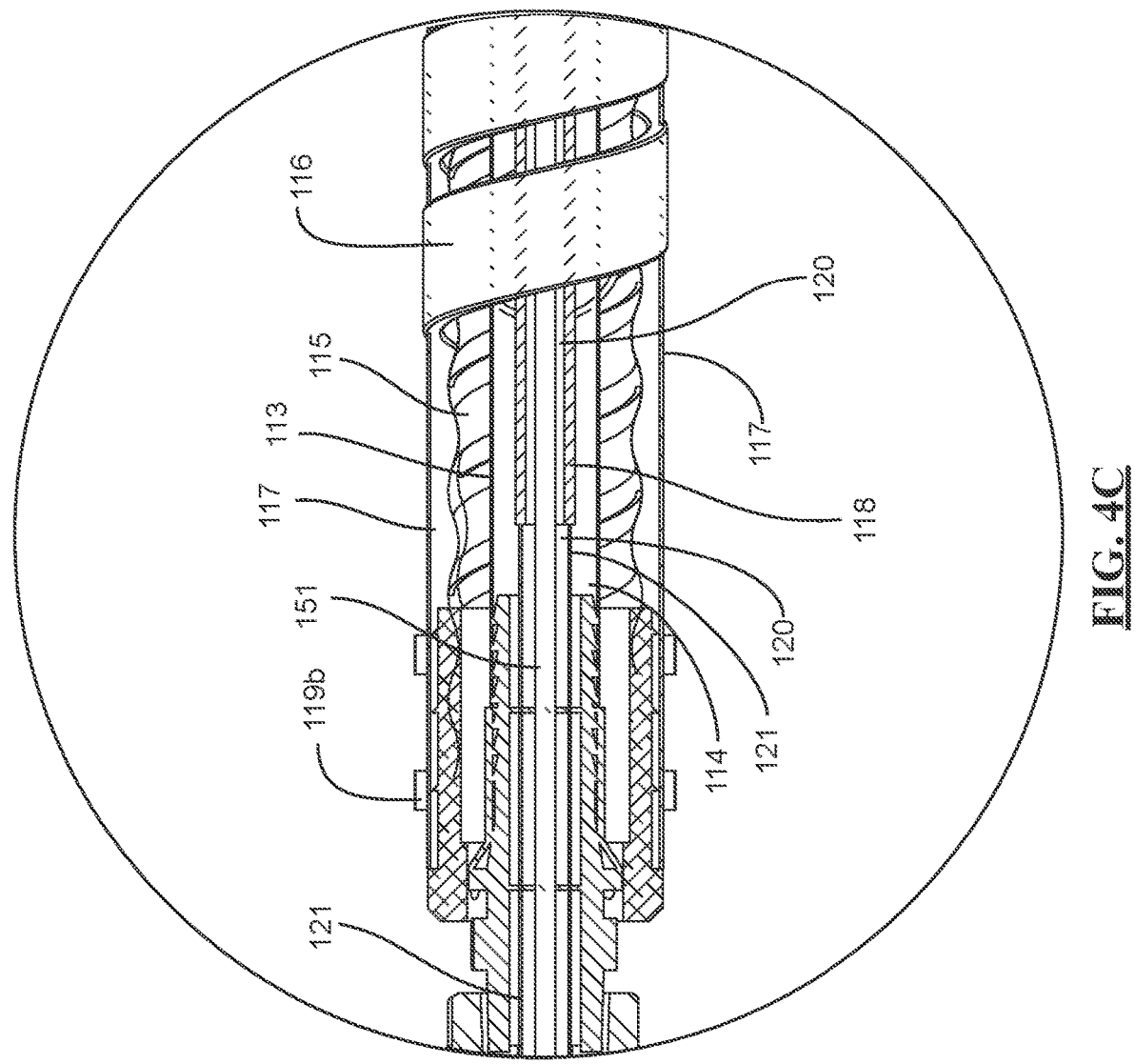
FIG. 4C is a detailed sectional view of a portion of FIG. 4B.
Figure 5A:
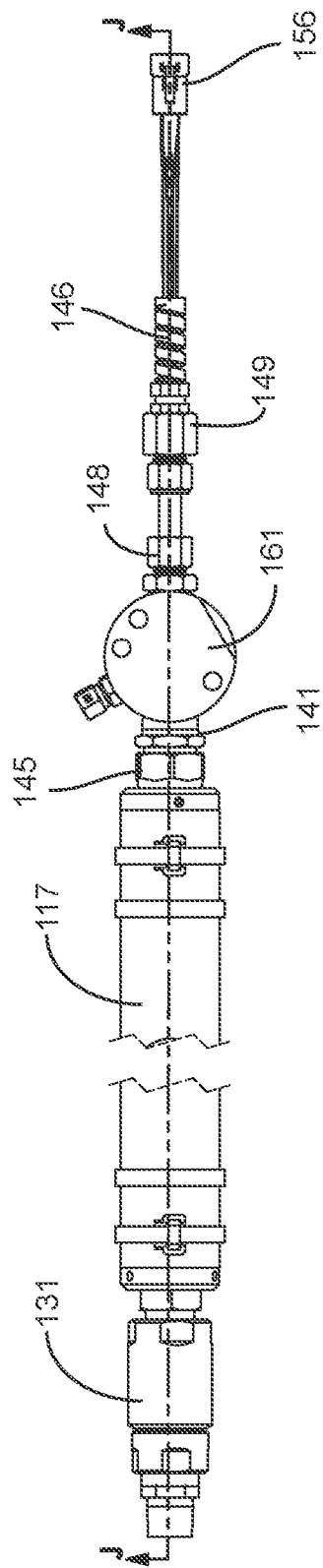
FIG. 5A is a bottom view of an embodiment of the hose of the present invention.
Figure 5B:
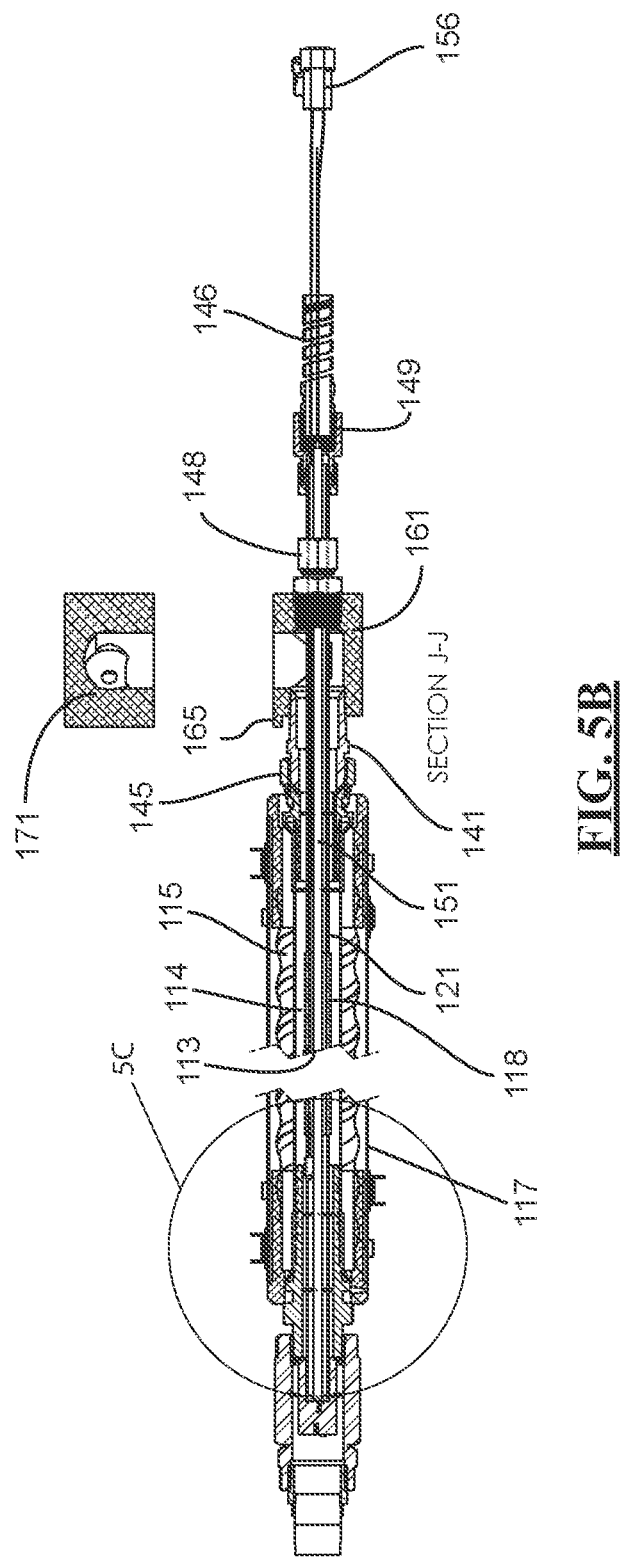
FIG. 5B is a side sectional view along line J-J of FIG. 5A.
Figure 5C:
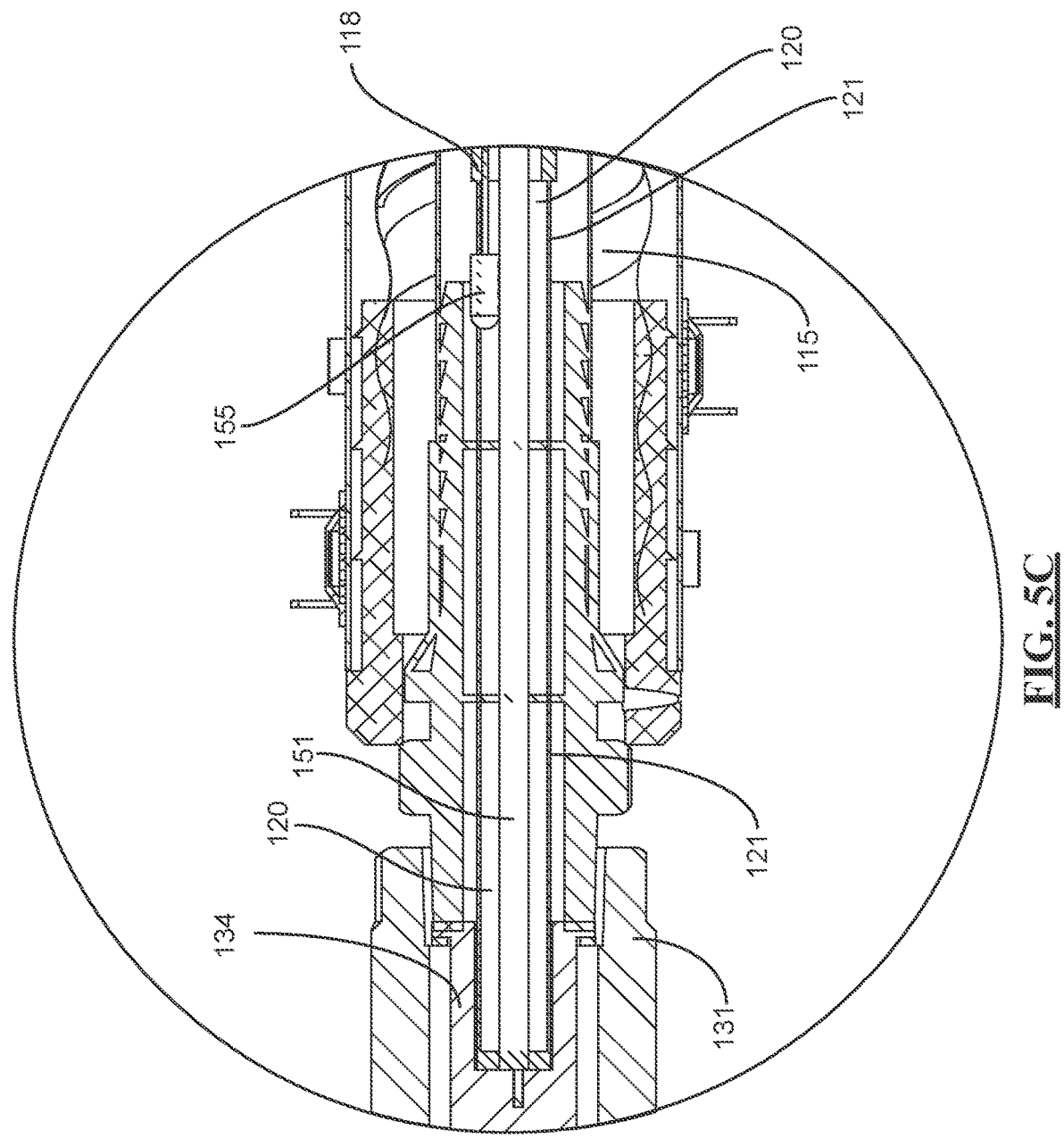
FIG. 5C is a detailed sectional view of a portion of FIG. 5B.

Referring to FIGS. 4B, 4C, 5B and 5C, it is seen that in embodiments of the invention, a flexible metallic sheath or thermowell 118 may be provided coaxially inside the hollow inner region 114 of conduit 113, leaving space in region 114 between the exterior of sheath 118 and the interior of conduit 113 through which hot asphalt materials will travel. Sheath 118 defines an elongated hollow interior coaxial region 120 that is designed to removably receive a heating element 151. When operating, heating element 151 heats the air around it inside sheath 118, which in turn heats the flexible metallic sheath 118 itself. This heat is transmitted to hot asphalt flowing around the outside of sheath 118 between conduit 113 and sheath 118, and keeps the asphalt in a fluid state as it passes through hose 111. In some embodiments, thermowell or sheath 118 may comprise a single flexible corrugated member that extends along the length of hose 111. In other embodiments, thermowell or sheath 118 may include rigid tubes 121 that may be welded or otherwise attached to one or both ends of the corrugated member 118, as shown in FIGS. 4C and 5C. In some embodiments, the corrugated member may be a ⅜" corrugated hose with an outer diameter of approximately 0.570" and the tube(s) 121 may be ½" so that they connect cleanly with the corrugated member. The embodiments having tube(s) 121 at one or both ends of sheath 118 make it easier to attach these ends to the outer hose assembly 111 using compression fittings or other hardware. It is to be appreciated that the inner and diameters of sheath 118 may vary depending on the diameter(s) of the material(s) from which sheath 118 is made, so long as it provides an inner coaxial region 120 capable of receiving the heating element 151, and also leaves space 114 between the exterior surface of sheath 118 and the interior surface of conduit 113 for the flow of hot asphalt materials. It is to be appreciated that in these embodiments, heating element 151 provides heat to both the flexible portion 118 of the thermowell as well as to the end tube(s) 121.

Figure 8:
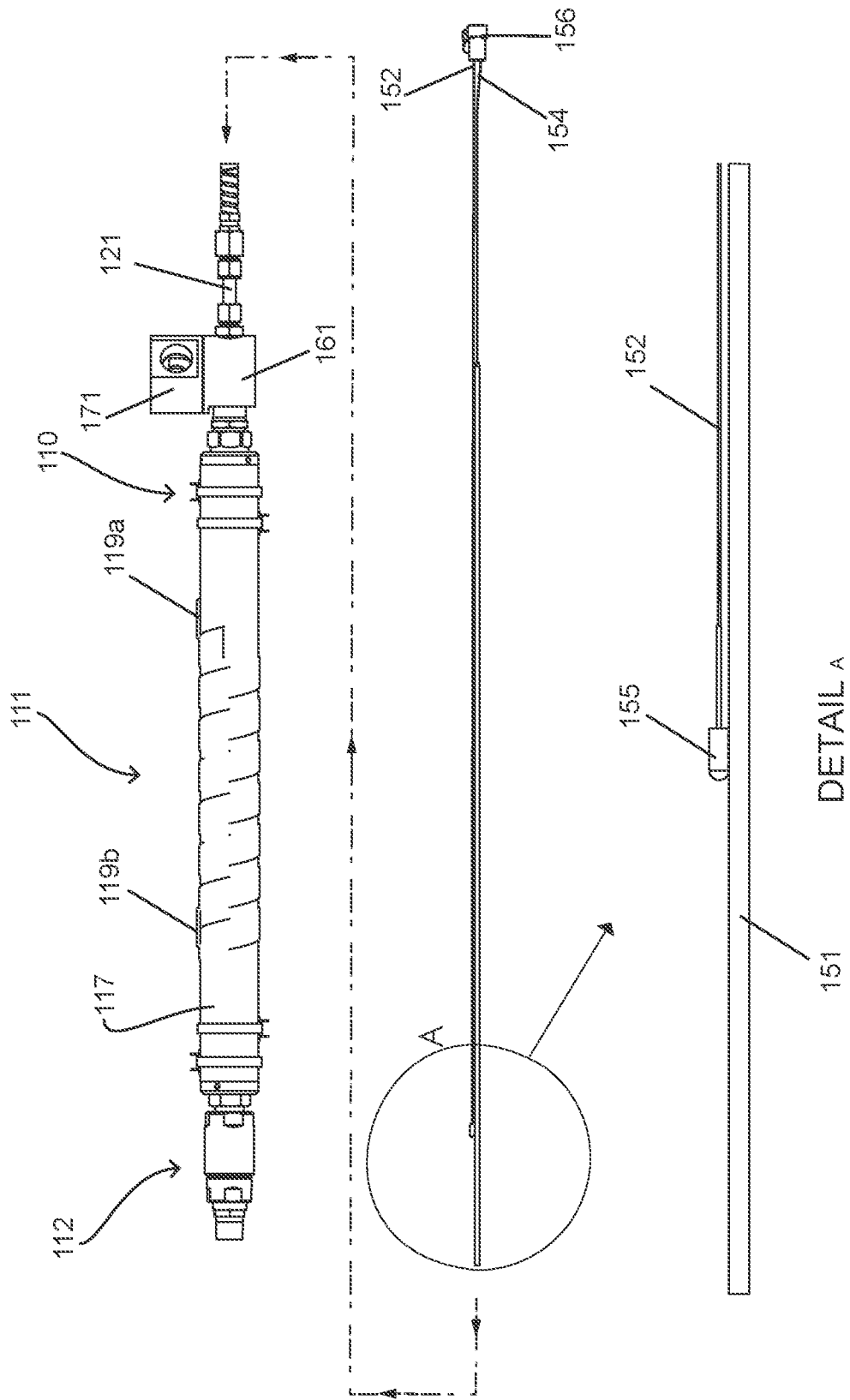
FIG. 8 is a diagrammatical view of an embodiment of the present invention showing the insertion of a heating element.

FIG. 8 shows an embodiment of a heating element 151 and an associated sensor 155 that are designed to be inserted into hose 111 as illustrated by the arrows in this figure. Heating element 151 may be provided in the form of a wire heater or other suitable elongated heating device. A proximal end of heating element 151 may be attached to a pair of wires 154 which provide electronic communication between heating element 151 and a connector 156. Similarly, sensor 155 is attached to a different pair of wires 152 which provide electronic communication between sensor 155 and connector 156. Heating element 151 and sensor 155 may be inserted into (and removed from) the flexible metallic sheath or thermowell 118, as shown in FIGS. 4B, 4C, 5B, 5C and 8.

Figure 7A:
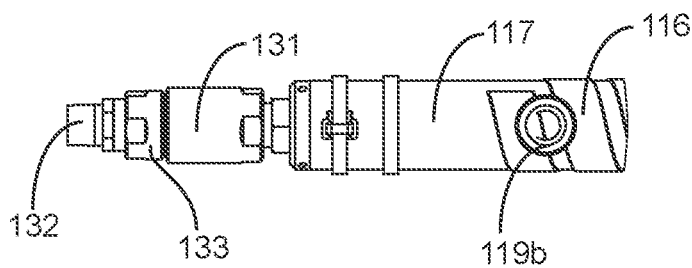
FIG. 7A is a side view of an opposite end of an embodiment of the hose of the present invention.
Figure 7B:
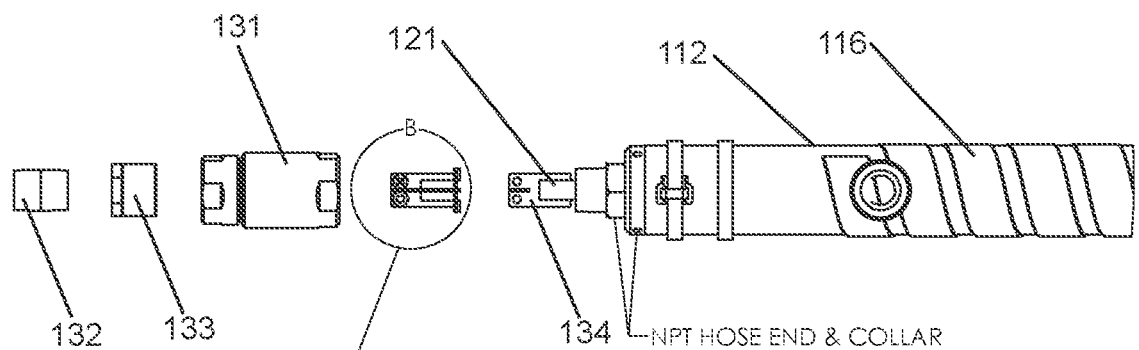
FIG. 7B is an exploded side view of an opposite end of an embodiment of the hose of the present invention.
Figure 7B:
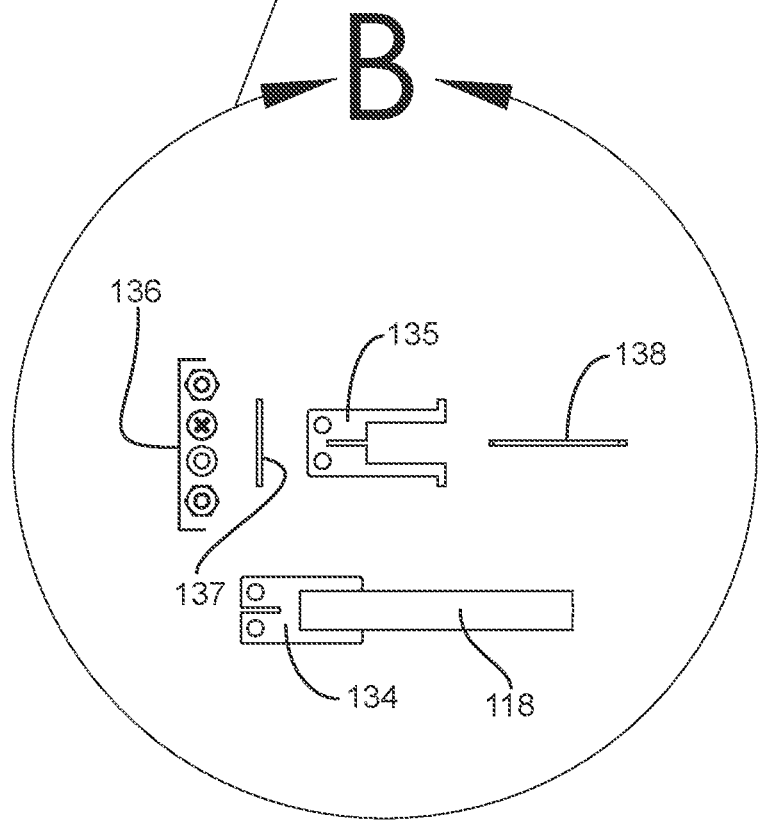

Referring to FIGS. 6A, 6B and 7, it is seen that in embodiments of the invention, the flexible metallic sheath or thermowell 118 may extend from a proximal end 110 of hose 111 to a distal end 112 of hose 111. In these embodiments, the distal end 121 of sheath 118 may be engaged with securing hardware as shown in the detail area "B" of FIG. 7. In some embodiments, a bracket 134 may be welded to the distal end of sheath 118, and may be secured to a similar bracket 135 that slides over bracket 134. Securing hardware 136 may be used in these embodiments to engage brackets 134 and 135 together along with guide 138, and one or more washers 137 may be fitted over the brackets 134 and 135 to hold them together and to space them (and the distal end 121 of the sheath) apart from the inside wall of coupling 131. Coupling 131 may be provided in the form of a swivel which may be attached at the distal end of hose 111 for rotatable engagement with an asphalt application wand 124. In some embodiments, a reducing coupling 133 and pipe nipple 132 may also be provided. FIGS. 6A, 6B and 7 also illustrate an optional helical exterior guard 116 which may be wrapped around all or at least a central portion of hose 111 to prevent the hose from being damaged from dragging on the ground. It is to be appreciated that the positioning of the end of the heatable sheath or thermowell 118 inside coupling (swivel) 131 provides heat inside coupling 131, thereby avoiding a potential cool spot.

FIGS. 6A and 6B also show an exemplary relationship between parts of an embodiment of the proximal end 110 of hose 111. In this illustrated embodiment, a junction block 161 may be provided for engagement with a proximal end 110 of hose 111. A connector 145 may be provided at the proximal end 110 of hose 111, and a hollow adapter 141 may be provided for engagement between connector 145 and an opening 168 in one side of junction block 161. Another adapter 148 may be provided for engagement with another opening 169 on the opposite side of junction block 161. A straight passageway 163 extends through junction block 161 between openings 168 and 169. (See FIG. 10A). Referring to FIG. 6B, it is seen that in this illustrated embodiment, the end 121 of the sheath or thermowell extends through connector 145, through adapter 141, through passageway 163 inside junction block 161, through adapter 148, and terminates at connector 149. In some embodiments, a bendable strain relief 146 may be engaged with connector 149 to help secure heating element 151 in place. Connectors 145 and 149 help to hold the end 121 of the sheath in a central axial orientation with respect to passageway 163. Heating element 151 may be removably inserted through bendable strain relief 146 into the end 121 of sheath 118 so that it extends generally coaxially albeit loosely along the length of sheath 118 to the distal end 112 of hose 111. It is to be appreciated that the positioning of the end 121 of the heatable thermowell in passageway 163 inside junction block 161 provides heat inside junction box 161 for the asphalt compound coming into junction block 161 from the heating machine, avoiding a potential cool spot.

Figure 10A:
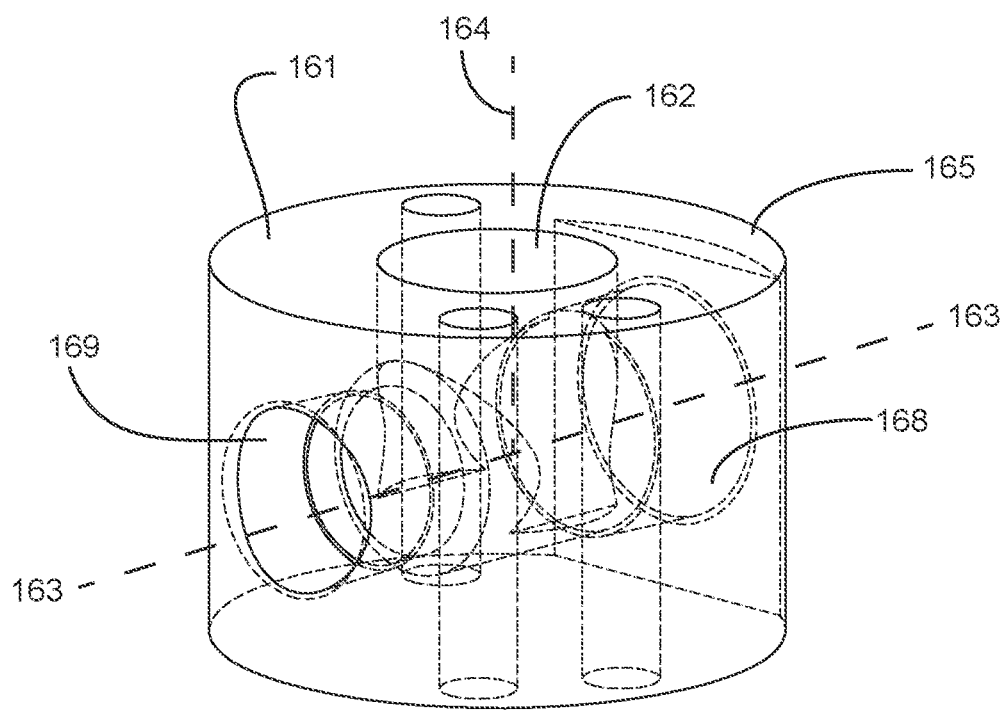
FIG. 10A is a transparent perspective view of a junction block of an embodiment of the present invention.

FIG. 10A provides a detailed transparent view of an embodiment of a junction block 161. As shown in FIGS. 10A, 4B and 5B, it is seen that a first straight passageway 163 is provided extending through junction block 161, having a first opening 168 for engagement with adapter 141, and a second opening 169 for engagement with adapter 148. A lip 165 is provided above opening 168. First opening 168 (and adapter 141) is wider than the second opening 169 because the first opening 168 must also receive hot asphalt from the asphalt machine. Adapters 141 and 148 sealingly engage with junction block 161 so that no asphalt leaks out from junction block 161, with sheath or thermowell 118 (or an end piece 121) extending across junction block 161 between adapters 141 and 148. A third opening 162 is provided at the top of junction block 161 which leads to a second passageway 164 that intersects first passageway 163 inside block 161 such that the passageways form an inverted "T" shape. See FIG. 10A. Hot asphalt enters the second passageway 164 through opening 162, reaches passageway 163, and is promptly heated by thermowell 118 or end piece 121. The asphalt is prevented from exiting through adapter 148 which acts as a plug, and therefore the hot asphalt must exit through the inside of adapter 141. Sheath 118 or end piece 121 is deployed through the center of adapter 141 causing the hot asphalt to travel around the outside of sheath 118, through adapter 141, and into the open coaxial region 114 of hose 111 where it travels along the length of hose 111 between the exterior surface of sheath 118 and the interior surface of conduit 113. When operating, the heating element 151 inside metallic sheath 118 causes sheath 118 and end piece(s) 121 to be heated, thereby keeping the asphalt hot as it stays in contact with sheath 118 and end piece(s) as it travels through passageway 163 and along the open region 114 of hose 111.

Figure 10B:
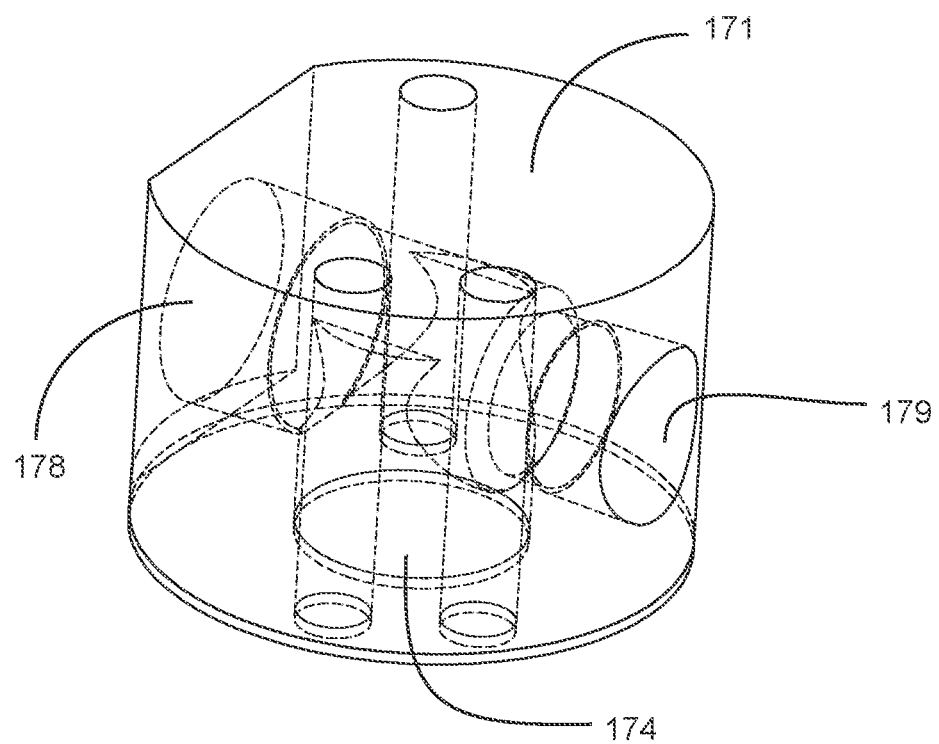
FIG. 10B is a transparent perspective view of a corresponding junction block of an embodiment of the present invention.
Figure 11A:
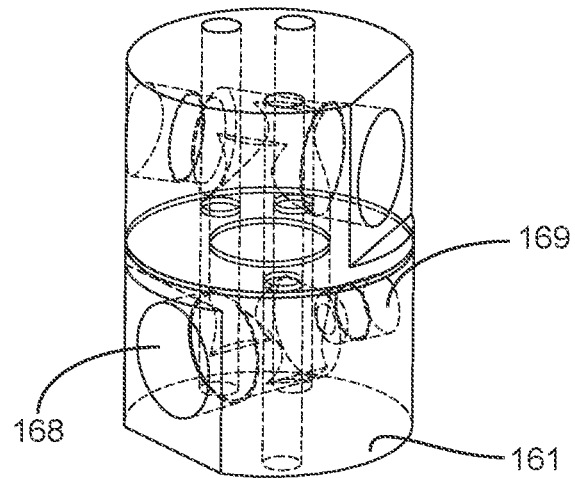
FIG. 11A is a transparent perspective view of a junction block joined with a corresponding junction block of an embodiment of the present invention.
Figure 11B:
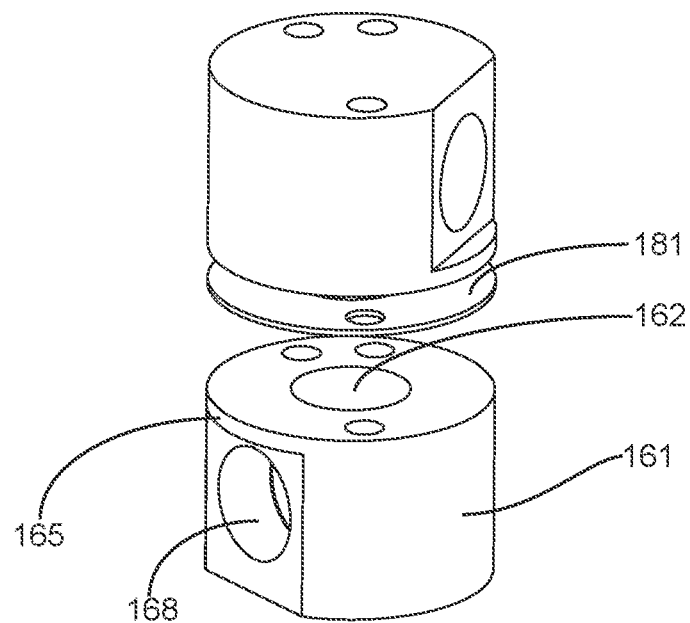
FIG. 11B is an exploded view of a junction block and a corresponding junction block of an embodiment of the present invention.

In some embodiments of the invention, a second junction block 171 may be provided as shown in FIG. 10B. Junction block 171 may be attached to junction block 161 as shown in FIGS. 11A, 6A and 8. A gasket 181 may be provided between blocks 161 and 171 as shown in the exploded view of FIG. 11B. In these embodiments, hot asphalt enters junction block 171 from the asphalt heating machine through opening 178 or 179, and exits through opening 174; the hot asphalt then enters junction block 161 through opening 162 and exits through adapter 141 that is engaged with opening 168. A separate passageway is provided between openings 178 and 179 in block 171 which may be used to provide a heating element for the incoming pipe from the heating machine that provides hot asphalt to block 171.

Figure 9A:
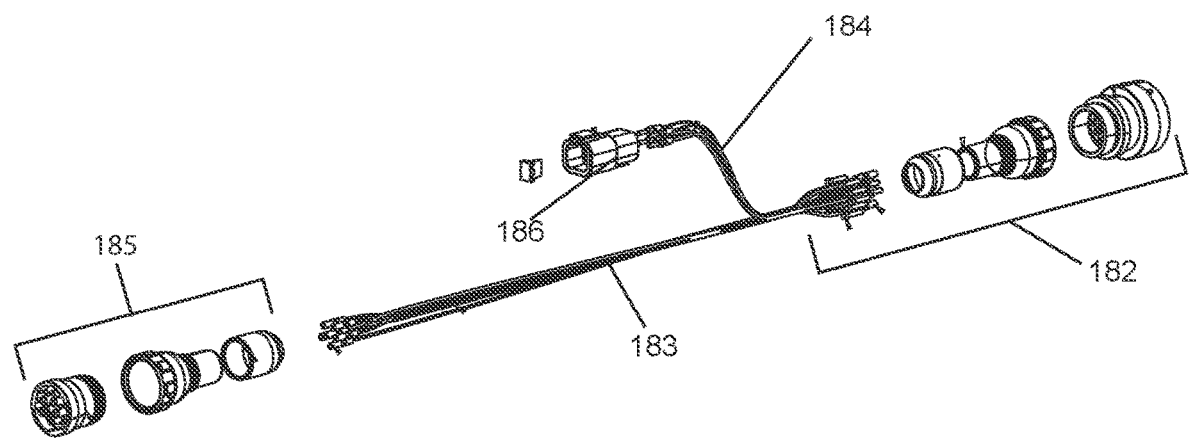
FIG. 9A is a side view of a wiring configuration for an embodiment of the present invention.
Figure 9B:
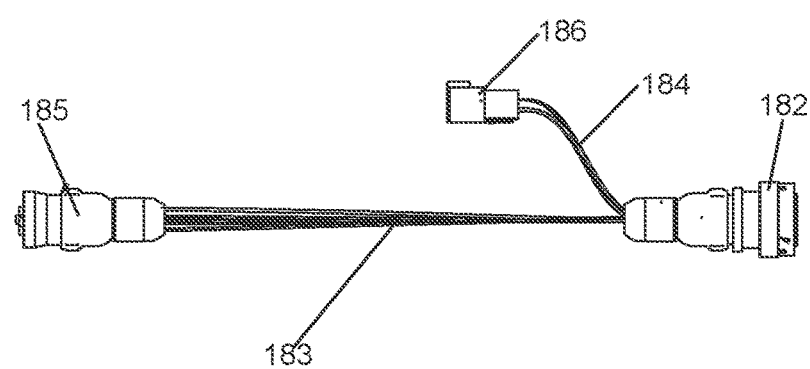
FIG. 9B is an exploded view of the configuration of FIG. 9A.

In embodiments of the invention, electrical wiring is provided for connection between a controller (not shown) and the controls on the wand handle 125 as well as the heating element 151 and sensor 155. As shown in FIGS. 9A and 9B, a large electrical connector assembly 182 is provided near the proximal end 110 of hose 111 for connection to a controller, and a smaller connector assembly 185 is provided near the opposite end 112 of hose 111 for connection to the wand controls on handle 125. The wiring 183 between connectors 182 and 185 is deployed along hose 111 between the insulation/tape 115 and the outside sleeve or jacket 117. The wiring 183 enters through a first grommet 119a near the proximal end 110 of hose 111, and exits through a second grommet 119b near the distal end 112 of hose 111. A second set of wires 184 is provided between large connector 182 and a third connector 186 which is designed for removable attachment to a mating connector 156 on heating element 151. (See FIG. 8). The third connector 186 places the heating element 151 and sensor 155 in electronic communication with the controller so that the temperature inside hose 111 may be monitored, and the heating element may be controlled by activation/deactivation in order to maintain a desired temperature.

Should the heating element fail, in embodiments of the invention it may be easily replaced. This is accomplished by disengaging the strain relief 146 holding the heating element 151 in place, and disconnecting connector 156 from the mating connector 186. The heating element 151 with sensor 155 may then be slidably removed from thermowell 118 and discarded or repaired. A new heating element 151 with a new sensor 155 may then be inserted into thermowell 118. The sealed strain relief 146 may be engaged to hold the new heating element in place, and connector 156 on the new heating element may be engaged with the mating connector 186. All of these steps may be accomplished in the field without detaching the heated hose 111 from the asphalt heating machine or from the wand.

In order to use an embodiment of the hose of the present invention, a pair of junction blocks 161 and 171 are attached to each other and to an asphalt heating machine 101. A flexible hose 111 having a swivel 131 at one end and a connector 145 at an opposite end is provided, the hose having an internal conduit 113 surrounded by insulation 115. A flexible metallic thermowell or sheath 118 is provided inside conduit 113 leaving a space 114 between sheath 118 and conduit 113, the sheath extending from a swivel 131 at one end of hose 111, to and through connector 145 at the opposite end, and into a passageway 163 inside block 161. The connector 145 of hose 111 is engaged with a hollow adapter 141 that is attached to block 161 through which thermowell 118 extends, providing a coaxial area 114 inside hose 111 for receiving a hot asphalt compound. A heating element 151 with associated sensor 155 is inserted into thermowell 118 and extends from one end of hose 111 to the other, as well as across a passageway 163 inside block 161. Heating element 151 and sensor 155 are electronically connected to a control on the heating machine. A wand 124 is attached to the swivel 131, and electronic connections are made between the wand and the control on the heating machine. Heating element 151 is then activated in order to heat up thermowell 118 so that asphalt is introduced into block 161 and hose 111 is kept hot inside block 161, along the length of hose 111, and through swivel 131. Hot asphalt is then introduced into block 161 and passes through hose 111 between sheath 118 and conduit 113 for application through a nozzle 128 and the end of wand 124. The supply and application of asphalt to cracks in the pavement may be controlled by the operation of controls on wand 124, allowing repairs to be made. The temperature of the hot asphalt inside the hose 111 is maintained and regulated by the control unit based on signals received from the sensor 155. In the event of a failure of heating element 151, it may be easily and quickly disconnected and removed from thermowell 118 and replaced by a new heating element without removal of the hose 111 and without taking the asphalt heating machine out of service.

It is to be understood that variations, modifications, and permutations of embodiments of the present invention, and uses thereof, may be made without departing from the scope of the invention. It is also to be understood that the present invention is not limited by the specific embodiments, descriptions, or illustrations, or combinations of either components or steps disclosed herein, and that different combinations of the features of the illustrated embodiments may be used in other embodiments, all within the scope of the invention. The illustrated embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A heatable hose for use with a heating machine for asphalt repair comprising:
   a. a flexible cylindrical conduit having insulation around an exterior surface thereof, and having a cylindrical inner surface defining a hollow internal cylindrical region;
   b. a flexible metallic sheath provided coaxially inside said internal cylindrical region of said conduit such that a coaxial space is provided between an outer surface of said sheath and the cylindrical inner surface of said conduit;
   c. an elongated heating element removably inserted into and extending along a length of an interior of said flexible metallic sheath; and
   d. a temperature sensor attached to said heating element, the sensor being adapted for removable insertion into the interior of the sheath with the heating element;
   wherein a heated asphalt compound introduced into said coaxial space is kept hot by the conduction of heat from the heating element to the flexible metallic sheath.

2. The heatable hose of claim 1 wherein a cylindrical jacket is provided around the insulation on said conduit, a first grommet is provided on an external surface of said jacket adjacent to a proximal end of said hose, a second grommet is provided on the external surface of said jacket adjacent to a distal end of said hose, and a plurality of wires are provided between said jacket and said insulation, said wires entering through one of said grommets and exiting through the other of said grommets.

3. The heatable hose of claim 2 wherein wires extending through said second grommet terminate at a connector that is adapted for engagement with a corresponding mating adaptor on an application wand.

4. The heatable hose of claim 2 wherein a first plurality of wires extending through said first grommet terminate at a first connector that is adapted for engagement with a first corresponding mating adaptor on said machine, and another plurality of wires extending through said proximal grommet terminate at a second connector that is adapted for engagement with a second corresponding mating adaptor on said heating element.

5. The heatable hose of claim 1 wherein a swivel is provided at a distal end of said hose.

6. The heatable hose of claim 1 further comprising a junction block adapted for engagement with a proximal end of said hose and with said heating machine for receiving said heated asphalt compound, said junction block having a first passageway extending through said block from a first side to an opposite side thereof, and a second passage way extending from a top of said block to and communicating with said first passageway.

7. The heatable hose of claim 6 wherein a pair of connectors are sealingly provided at opposite ends of said first passageway, each of said pair of connectors having a central opening therein for sealingly receiving said flexible metallic sheath such that said sheath extends across and through said first passageway leaving space in said passageway around said sheath for receiving said heated asphalt compound.

8. The heatable hose of claim 1 wherein at least one rigid metallic tube is attached to at least one end of said flexible metallic sheath.

9. The heatable hose of claim 8 further comprising a junction block adapted for engagement with said rigid metallic tube and with said heating machine for receiving said heated asphalt compound, said junction block having a first passageway extending through said block from a first side to an opposite side thereof, and a second passage way extending from a top of said block to and communicating with said first passageway.

10. The heatable hose of claim 9 wherein a pair of connectors are sealingly provided at opposite ends of said first passageway, each of said pair of connectors having a central opening therein for sealingly receiving said rigid metallic tube such that said tube extends across and through said first passageway leaving space in said passageway around said tube for receiving said heated asphalt compound.

11. The heatable hose of claim 1 wherein a first rigid metallic tube is attached to a proximal end of said sheath, and a second metallic tube is attached to a distal end of said sheath.

12. The heatable hose of claim 11 further comprising hardware for fixedly attaching said second metallic tube to a connector at a distal end of said conduit.

13. The heatable hose of claim 11 further comprising a connector fixedly attached to said first metallic tube at a proximal end of said conduit.

14. The heatable hose of claim 13 further comprising an adaptor fixedly attached to said first metallic tube at a proximal end of said conduit.

15. A heatable hose for use with a heating machine for asphalt repair comprising:
   a. a flexible cylindrical conduit having insulation around an exterior surface thereof, a cylindrical jacket provided around the insulation, and having a cylindrical inner surface defining a hollow internal cylindrical region;
   b. a flexible metallic sheath provided coaxially inside said internal cylindrical region of said conduit such that a coaxial space is provided between an outer surface of said sheath and the cylindrical inner surface of said conduit, said sheath having a second hollow internal cylindrical region;
   c. an elongated single-piece wire heating element adapted for removable insertion into said second hollow interior region of said flexible metallic sheath;
   d. a first grommet provided on an external surface of said jacket a temperature sensor attached to said wire heating element, the sensor being adapted for removable insertion with said wire heating element; adjacent to a proximal end of said hose through which a plurality of wires enters said jacket; and
   e. a second grommet provided on the external surface of said jacket adjacent to a distal end of said hose through which said plurality of wires exits said jacket;
wherein a heated asphalt compound introduced into said coaxial space is kept hot by the conduction of heat from the heating element to the flexible metallic sheath.

16. A heatable hose comprising:
   a. a flexible cylindrical conduit having a proximal end and a distal end, insulation around an exterior surface thereof, and having a cylindrical inner surface defining a hollow internal cylindrical region;
   b. a flexible metallic sheath having a proximal end and a distal end provided coaxially inside said internal cylindrical region of said conduit such that a coaxial space is provided between an outer surface of said sheath and the cylindrical inner surface of said conduit;
   c. an elongated heating element removably inserted into and extending along a length of an interior of said flexible metallic sheath; and
   d. a temperature sensor attached to said heating element, the sensor being adapted for removable insertion into the interior of the sheath with the heating element;
wherein the proximal end of the sheath is attached to the proximal end of the conduit, and the distal end of the sheath is attached to the distal end of the conduit.

* * * * *